United States Patent [19]

Barba et al.

[11] Patent Number: 4,683,407
[45] Date of Patent: Jul. 28, 1987

[54] AUTHORITY LIMITER

[75] Inventors: Valentin G. Barba, Princeton Junction, N.J.; Eugene E. Shube, Elmont, N.Y.

[73] Assignee: Plessey Incorporated, New York, N.Y.

[21] Appl. No.: 719,150

[22] Filed: Apr. 2, 1985

[51] Int. Cl.⁴ .................. G05B 17/00; B64C 3/18
[52] U.S. Cl. ......................... 318/689; 318/45; 318/434; 318/640; 318/584; 318/585; 244/76 A
[58] Field of Search .............. 318/689, 676, 648, 640, 318/582, 584, 585, 586, 434, 628, 45, 48; 244/76 A, 177, 178, 79, 75 R, 76 R, 213, 228; 73/862.33, 862.34, 862.35, 862.31

[56] References Cited

U.S. PATENT DOCUMENTS

| | | | |
|---|---|---|---|
| 2,511,846 | 6/1950 | Halpert | 318/689 X |
| 3,111,028 | 11/1963 | Lebow | 73/136 |
| 3,182,244 | 5/1965 | Fitzroy | 318/689 X |
| 3,329,012 | 7/1967 | Demuth | 73/136 |
| 3,496,436 | 2/1970 | Gronner | 318/18 |
| 3,587,420 | 6/1971 | Llop | 318/640 X |
| 3,593,093 | 7/1971 | Bettcher | 318/640 X |
| 3,673,977 | 7/1972 | Hendley | 318/640 X |
| 3,848,833 | 11/1974 | Rauschelbach | 244/177 |
| 3,886,562 | 5/1975 | Atzinger | 318/640 X |
| 4,006,395 | 2/1977 | Reesen | 318/640 X |
| 4,182,979 | 1/1980 | Douglas | 318/689 X |
| 4,184,107 | 1/1980 | Turini | 318/640 X |
| 4,446,746 | 5/1984 | Aoshima et al. | 73/862.33 |

Primary Examiner—William M. Shoop, Jr.
Assistant Examiner—Patrick C. Keane
Attorney, Agent, or Firm—Fleit, Jacobson, Cohn & Price

[57] ABSTRACT

An authority limiter includes an input shaft clutched to an output shaft. The output shaft is geared to a motor. Opto-sensors provide control signals to a current source supplying power to the motor. Different amounts of opposing torque are applied by the motor dependent upon the positioning of a disc, mechanically attached to the output shaft, effecting the optical path in the opto-sensors. In another embodiment, the opto-sensor control is replaced by an electro-mechanical mechanism which senses various thresholds corresponding to angular positions of the coupled input and output shafts.

6 Claims, 9 Drawing Figures

AUTHORITY LIMITER

The present invention relates to an authority limiter, e.g., a mechanism which provides a desirable opposing force or torque schedule by electrical means. When installed in airplanes, this mechanism provides an electrical clutched additional torque schedule to the lateral or roll control system to limit the power control unit's output when operated through the autopilot transfer device.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

BRIEF DESCRIPTION OF DRAWINGS

For a fuller understanding of the nature and objects of the invention, the following detailed description is provided which is taken in connection with the accompanying drawings, in which.

DETAILED DESCRIPTION OF THE INVENTION

Figure 1:
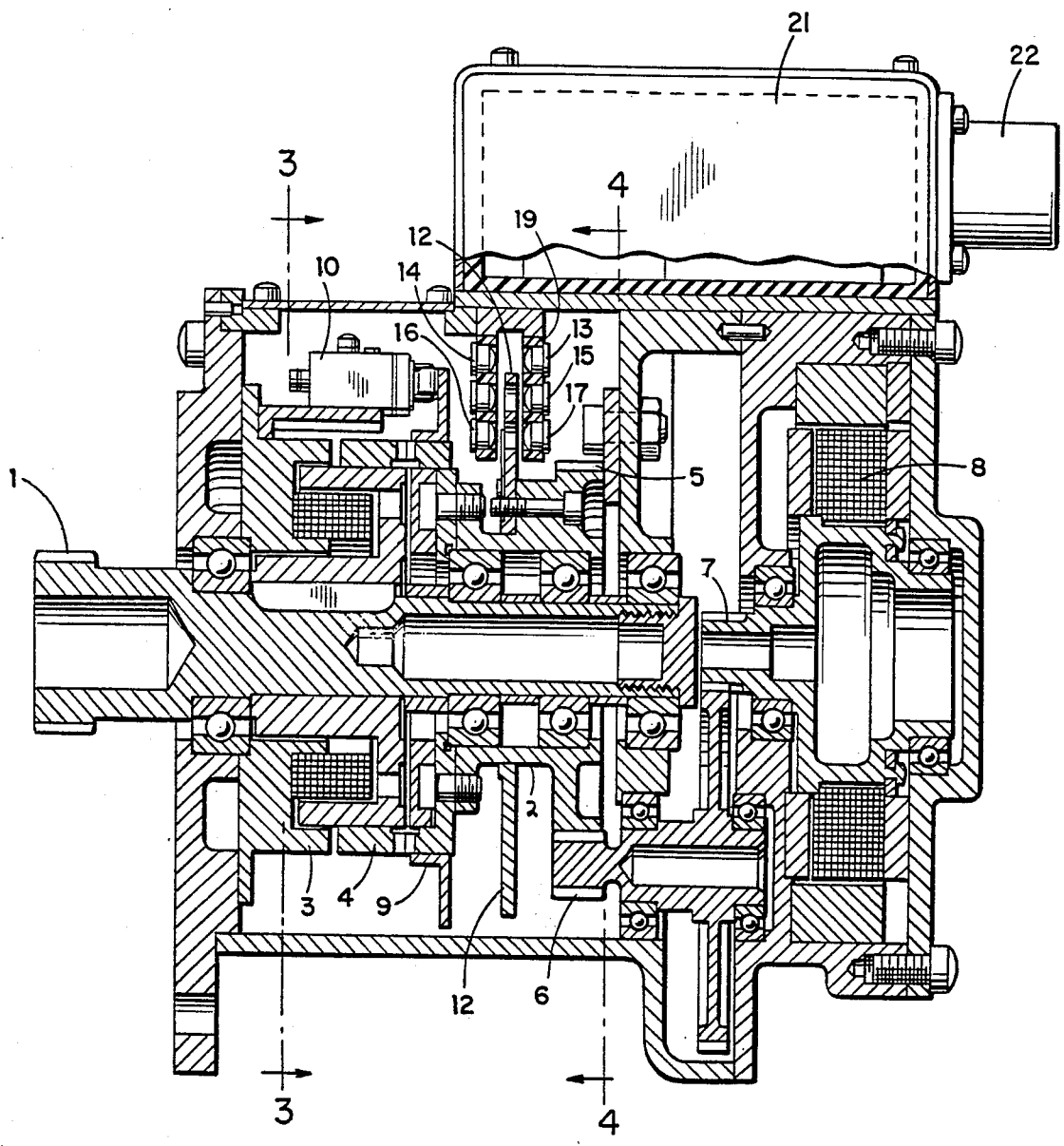
FIG. 1 is an axial section of an embodiment of the present invention, illustrating an electrical clutched opposing torque mechanism.
Figure 2:
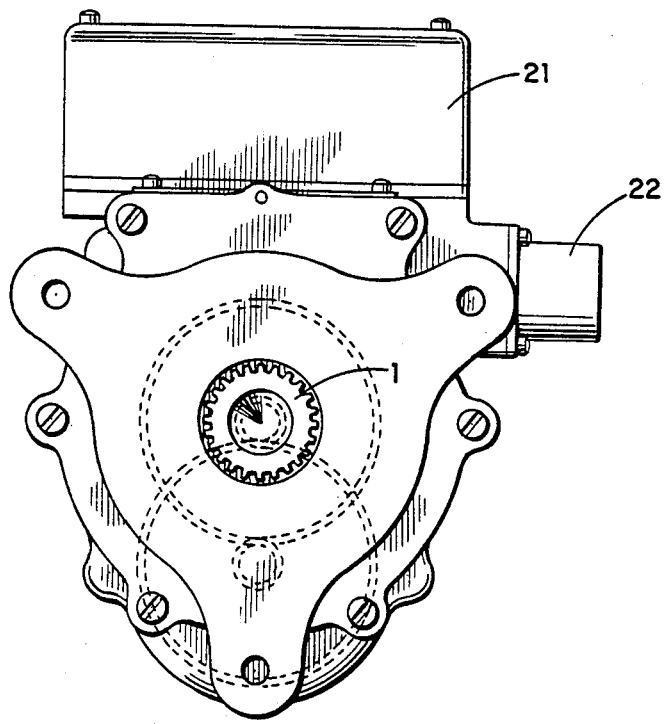
FIG. 2 is a front view of the mechanism shown in FIG. 1.

Referring to drawings, in which like numerals identify similar parts throughout, FIGS. 1 to 7, inclusive, illustrate an embodiment of the torque schedule mechanism for autopilot lateral control.

The mechanism consists basically of a geared torque motor, the relating electronics and an electromagnetic clutch. The input shaft 1, which is normally free to rotate in either direction, becomes coupled to the motor gear output shaft 2 at the instant the power is applied to the clutch terminals, i.e., when the autopilot is activated. When in the engaged position, the torque required to rotate the input shaft in either direction follows the envelope determined by a position disc 12 attached to the motor gear output shaft 2 in accordance with the related electronics as described later with respect to an embodiment of the present invention. At the moment the clutch is disengaged, the motor gear output shaft 2 returns automatically to its initial position.

FIGS. 1 to 7 inclusive, illustrate an embodiment of the mechanism object of the present invention in which two levels of resistance torque $T_1$ and $T_2$, i.e., two degrees of scheduled torque, for each direction of output shaft rotation are provided. As can be seen from FIG. 1, the input shaft 1 becomes coupled to the motor gear output shaft 2 at the instant the power is applied to the electromagnetic clutch 3. Attached to the shaft 2 are the clutch armature 4 and the spur gear 5. This spur gear 5, together with spur gear 6 and rotor pinion 7 form a two stage gear coupled to the torque motor 8.

Figure 3:
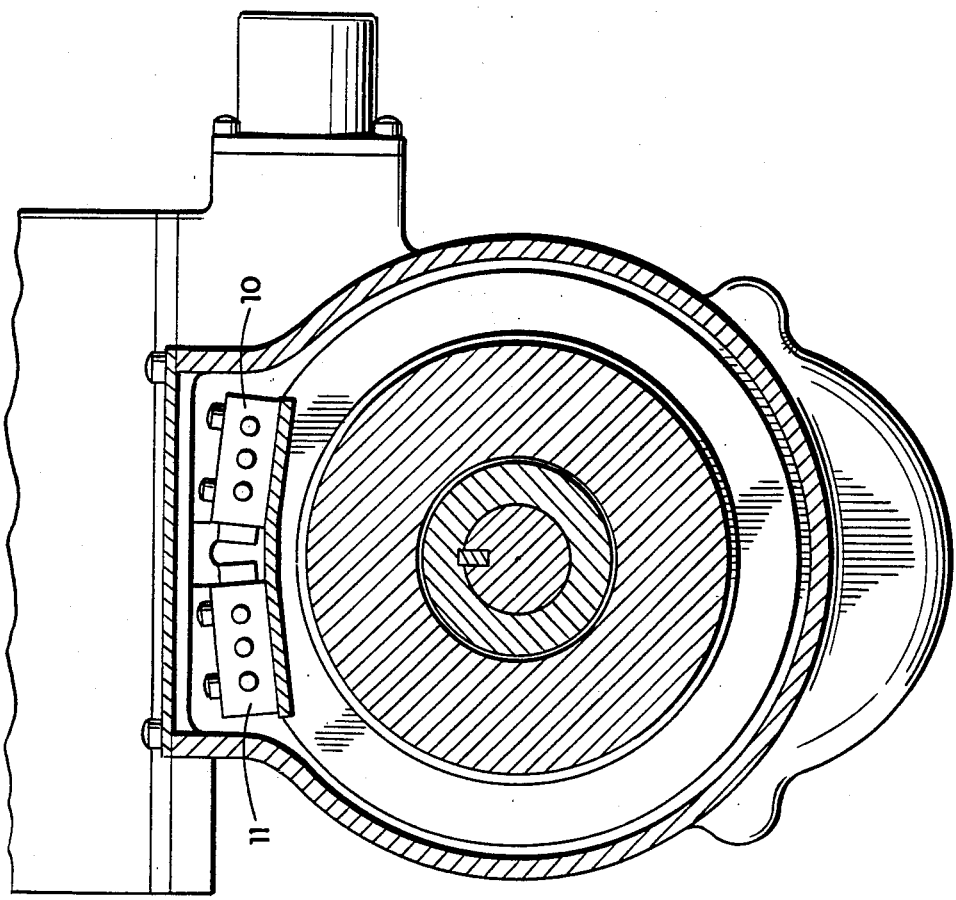
FIG. 3 is a transverse section taken substantially on line A—A of FIG. 1.

Attached to the clutch armature 4 is a disc 9, which activates switches 10, 11 (switch 11 is shown in FIG. 3) signalling the clutch status, and an obtruding disc 12 which activates three opto coupler sensors including LED-sensor pairs 13-14, 15-16 and 17-18 which in turn are mounted in a support bracket 19, to the main housing 20. The related electronics is packaged in an electrical assembly 21 and an electric connector 22 is used for the external power supply and for the control signals.

Figure 5:
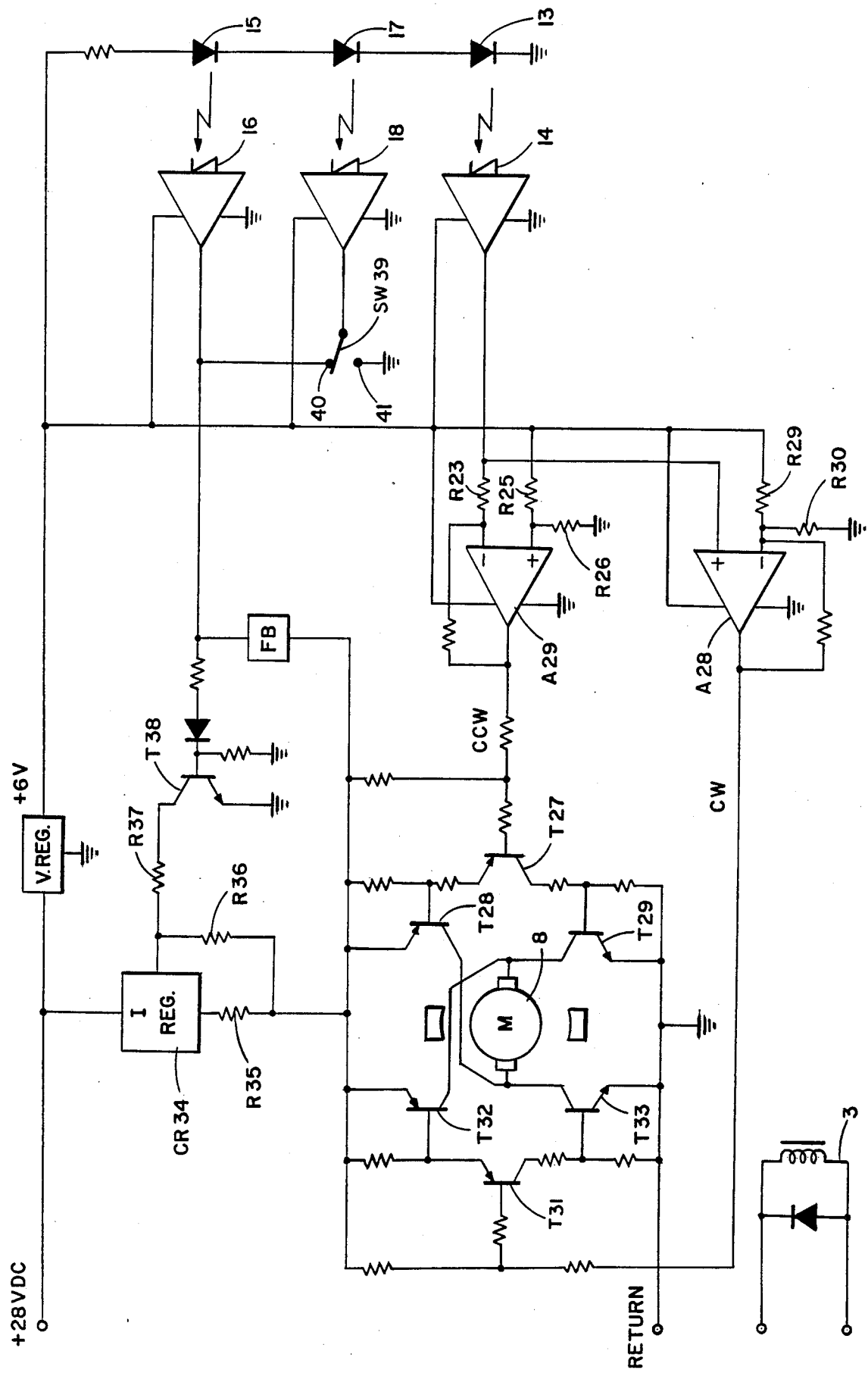
FIG. 5 is the schematic circuit of the mechanism shown in FIG. 1.
Figure 6A:
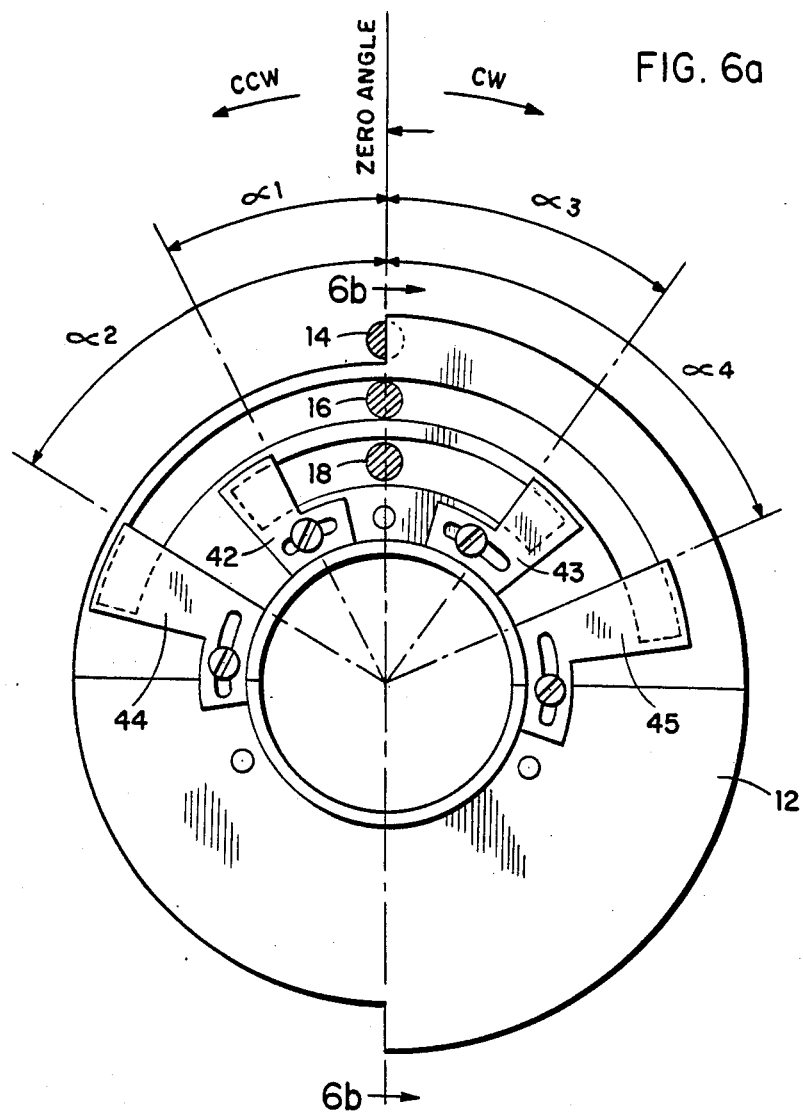
FIG. 6a details the positioning disc and optical sensor locations.
Figure 6B:
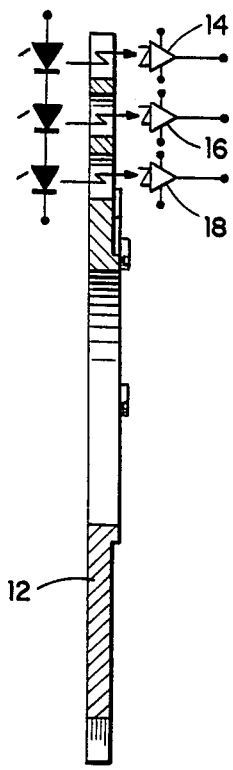
FIG. 6b shows a cross-sectional view of the positioning disc and optical sensors at the zero position.

To describe the mode of operation of the mechanism we will consider first that the obtruding disc 12 is in a zero position as it is shown in FIGS. 6a and 6b, the clutch 3 is engaged. In this position half of the sensor 14 active area is illuminated by the light emitting diode 13 (due to the etched outer radial slot on disc 12) and therefore the output voltage of this sensor will be half of its maximum value, which occurs when all its active area is illuminated. As shown in the schematic of FIG. 5, the output voltage of sensor 14 is applied through a resistance R23 to the inverting input terminal of a operational amplifier A24. Through the divider formed by two resistances R25 and R26, a slightly higher voltage value is applied to the noninverting input terminal. Therefore, the output voltage of the op amp A24 is "high", transistor T27 is "off" and therefore bridge power transistors T28 and T29 are "off".

The same output voltage of the sensor 14 is applied to the noninverting terminal of the operational amplifier A28. Through the divider formed by resistances R29 and R30 a slightly lower voltage is applied to the inverting input terminal. Therefore the output voltage of the op amp A28 is "high", transistor T31 is "off" and bridge power transistors T32 and T33 are "off" too. In conclusion, when the disc 12 is in the zero position, all bridge power transistors are off and, therefore, because the torque motor 8 is disconnected from power supply, no resistance torque is provided.

Slight rotations of the input shaft in either direction will produce the same rotations of the obtruding disc 12 followed by variations of the illuminated active area of the sensor 14 and by corresponding variations of the sensor 14 output voltages. If the disc is rotated in the clockwise CW direction (with respect to FIG. 6a) the sensor 14 illuminated active area will increase, the positive output voltage of sensor 14 applied to op amp A24 and A28 will increase accordingly, op amp A28 will stay high but op amp A24 will turn "low" and therefore transistors T27 T28 and T29 will turn "on" and will connect the motor 8 to the power supply. The current supplied to the motor and controlled by the current regulator CR34 produces a torque in CCW (counter clockwise) direction and therefore the motor will try to bring the disc 12 back to the initial zero position. The motor opposing torque is proportional to the current supplied by current regulator CR 34 connected as a constant current source.

Two values of constant current and therefore two values for motor opposing torque on either direction corresponding to two angle modes of operation are determined by the status of the transistor T38 controlled by the outputs of the sensors 16 and 18. When outputs sensors 16 and 18 are high, the transistor T38 is "on", and the resistances R35, R36 and R37 establish the first level of the current delivered by the regulator CR34 corresponding to the torque $T_1$.

When output of sensors 16 or 18 or both outputs are "low" the transistor T38 is cut off and a second level for the current delivered by the regulator CR34 corresponding to the torque $T_2$ is established by the resistances R35 and R36, the resistance R37 being disconnected from the ground. By operating the switch SW 39, two modes, $a_1$–$a_3$ mode (hereinafter $a_1$, $a_2$, $a_3$ and $a_4$ correspond to the Greek letter alpha in the drawings), when SW 39 is connected to the terminal 40, and $a_2$–$a_4$ when SW 39 is connected to terminal 41, are provided. In $a_1$–$a_3$ angular mode, the first torque level is maintained at the $T_1$ value between zero angle and $a_1$ for CW rotation of the disc 12 and at the $T_1$ value between zero angle and $a_3$ for CCW rotation of the disc 12 because the sensor 18 is permanently illuminated and therefore the transistor 38 is "on"; for disc rotations higher than $a_1$ in CW direction and higher than $a_3$ in CCW direction, the output voltage of the sensor 18 turns low because the sensor 18 enters in a dark zone, i.e., disc 12 interrupts the optical path between LED 17 and sensor 18. By turning sensor 18 "low" the transistor T38 is cut off and the second current level is delivered by the current regulator CR34. Therefore in $a_1$–$a_3$ mode for a disc angle rotation higher than $a_1$ in CW direction and higher than $a_3$ in CCW direction, the opposing torque of the motor will increase at the $T_2$ value for either CW or CCW input shaft rotation. The value of angles $a_1$ and $a_3$ can be adjusted by moving plates 42 and 43 over the slots in disc 12.

In $a_2$–$a_4$ mode the sensor 18 output is connected to the ground terminal 41 by the switch 39 and therefore the torque level angles are controlled by the sensor 16. The first torque level is maintained now at the $T_1$ value between zero angle and $a_2$ for CW rotation of the disc 12 and at the same $T_1$ value between zero angle and $a_4$ for CCW rotation of the disc 12 because within these angles the sensor 16 is illuminated; for disc 12 rotations greater than $a_2$ in CW direction and greater than $a_4$ in CCW direction, the sensor 16 enters in dark zones and therefore its output is turned "low", transistor T38 is cut off and the second current level is delivered by the regulator CR34 to the torque motor 8. Therefore in $a_2$–$a_4$ mode, for a disc 12 angle rotation higher than $a_2$ in CW direction and higher than $a_4$ in CCW direction, the opposing torque of the motor will increase at the $T_2$ value for either CW or CCW input shaft rotation. The value of angles $a_2$ and $a_4$ can be adjusted by moving the plates 44 and 45.

Figure 7:
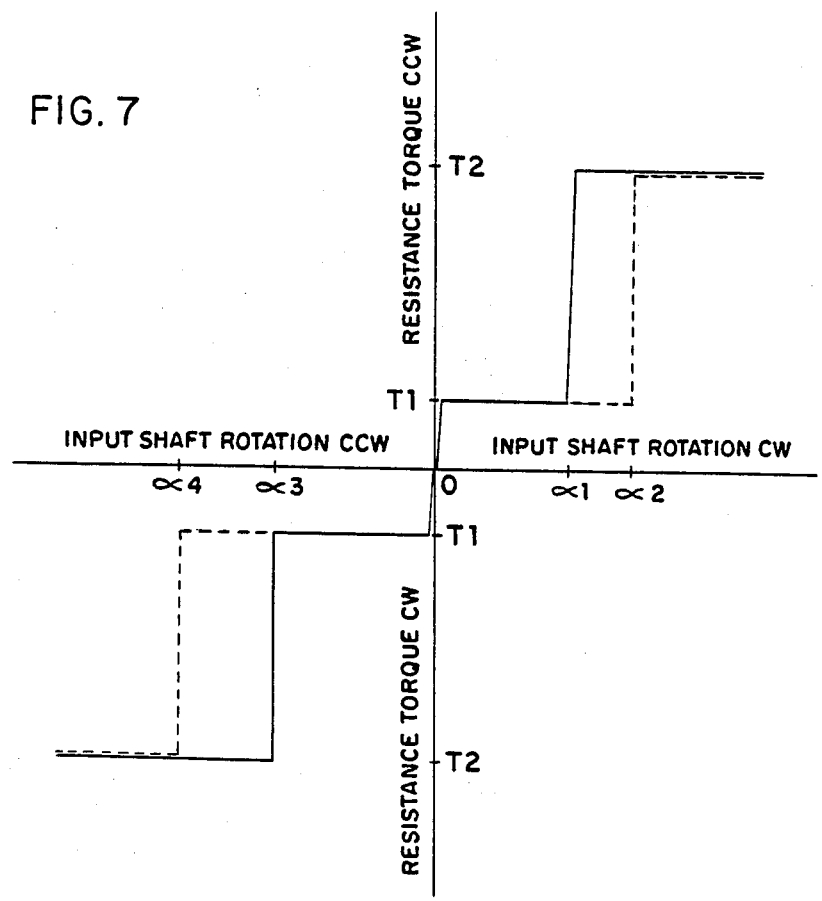
FIG. 7 shows the relationship between the resistance torque and the shaft rotation.
Figure 4:
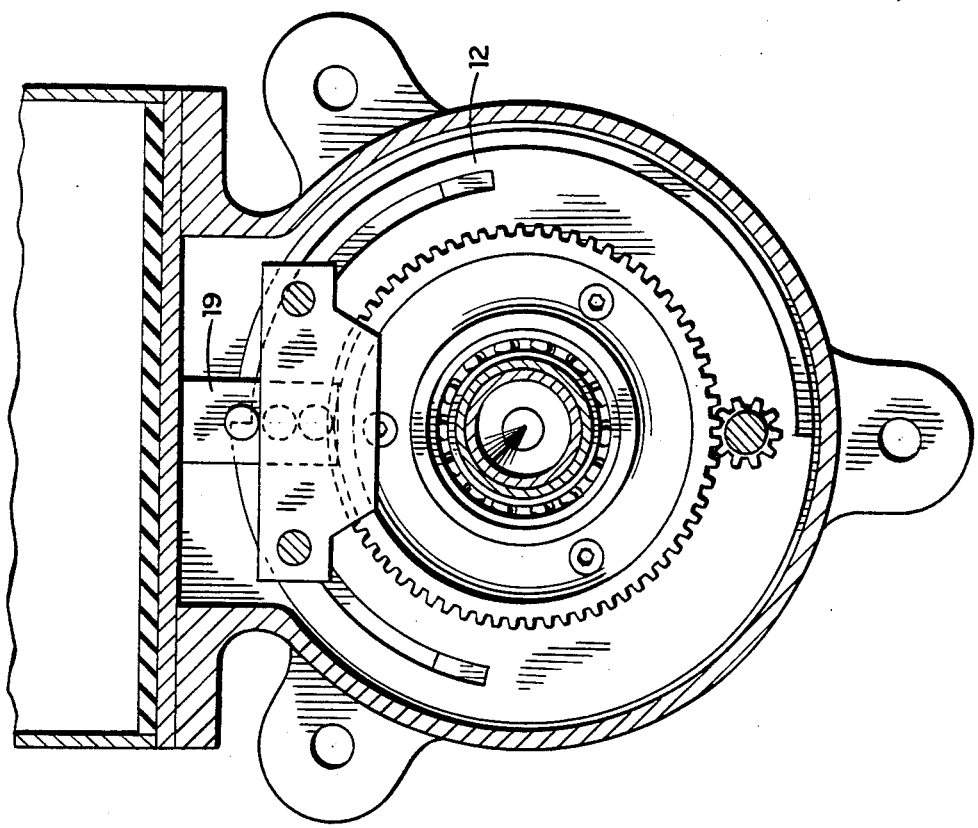
FIG. 4 is a partial section taken on line B—B of FIG. 1.

FIG. 7 shows graphically the relationship between resistance torque versus input shaft rotation. In one working embodiment, the torque on the input shaft is constant within an angular rotation of 17 to 125 degrees. The restoring torque within that range is 125 pound inches.

Figure 8:
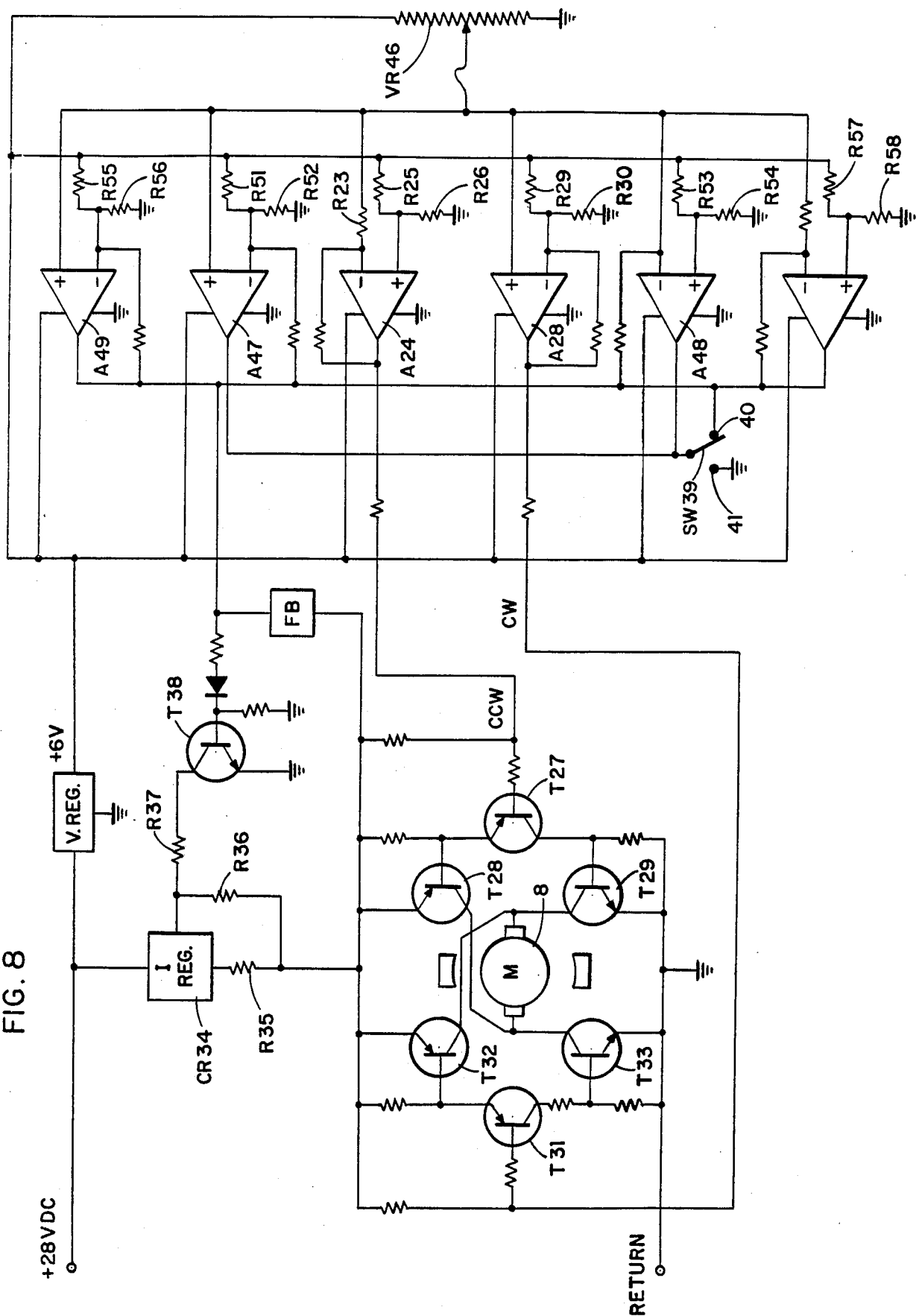
FIG. 8 is the schematic circuit of the mechanism which utilizes a potentiometer as the position sensor.

FIG. 8 represents an embodiment of the present invention in which the positioning disc 12 and opto couplers 13-14, 15-16 and 17-18 are replaced by a positioning potentiometer VR 46 and a pair of op amps for each angle mode, op amps A47, A48, for $a_1$–$a_3$ mode and op amps A49, A50, for $a_2$–$a_4$ mode. The positioning potentiometer is mechanically coupled to the clutch armature 4 as described above with respect to obtruding disc 12.

The value of angles $a_1$ and $a_3$ can be adjusted by adjusting resistance dividers R51-R52 and R53-R54. The value of angles $a_2$ and $a_4$ can be adjusted by adjusting resistance dividers R55-R56 and R57-R58.

In order to enable a complete understanding of the present invention, two examples are set forth. It is understood, however, that the invention is not limited thereto, and such modifications and variations as are embraced by the spirit and scope of the appended claims are contemplated as being within purview of the present invention.

What is claimed is:

1. In combination with an autopilot trasnfer device, an authority limiter comprising:
   a. an input shaft which is normally free to rotate in either direction;
   b. a motor gear output shaft;
   c. an electromagnetic clutch used to couple the input shaft to the motor gear output shaft;
   d. a torque motor geared to said output shaft;
   e. An obtruding disc attached to the motor gear output shaft, said obtruding disc having at least three arcuate cut-out portions therethrough respectively indicative of a null agular position of said output shaft and at least two predetermined degrees of permissible angular deviation in either direction from said null position by said output shaft;
   f. at least three stationary opto sensors activated by the presence or absence of said cut-out portions of said obtruding disc and producing outputs respectively representative of the direction of angular deviation by said output shaft from said null position and of any angular deviation exceeding either of said two predetermined degrees of angular deviation; and
   g. an electronic circuit means for controllably applying at least two scheduled currents, dependent upon the outputs of said opto sensors, to said torque motor to generate two corresponding scheduled opposing torques in either opposing direction on said output shaft when the angular deviation thereof exceeds a corresponding predetermined degree of angular deviation.

2. The combination as in claim 1 wherein said authority limiter operates from the null angular position dependent upon the circumferential arcuate spans of said cut-out portions and a plurality of scheduled opposing torque values are applied to said output shaft in accordance with a corresponding plurality of predetermined angle modes defining predetermined degrees of permissible angular deviations and represented by said circumferential spans; said obtruding disc having an etched slot as a first cut-out portion for said null angular position and one slot corresponding to another cut-out portion for every predetermined angle mode provided by the authority limiter.

3. The authority limiter as in claim 2, wherein said obtruding disc having means for adjusting to any desired angle a plurality of separate plates movably attached proximate said slots to the surface of said obtruding disc.

4. The authority limiter as in claim 1, said opto sensors being activated by the obtruding disc, one sensor for detecting the null angular position of said obtruding disc and the attached output shaft and coupled to means for activating a motor bridge to connect the torque motor to a power source such that the torque delivered by the motor will oppose the torque of said output shaft any time the obtruding disc is offset from said null angular position, and other sensors for every angle mode defining predetermined degrees of permissible angular deviations by said output shaft provided by the authority limiter, each of said other sensors coupled to further means for controlling the scheduled current supplied to the motor.

5. The authority limiter as in claim 4, said electronic circuit means having a three terminal regulator connected as a constant current source to said motor, two constant current levels being provided to said motor by using a transistor as a switch activated by the sensors.

6. In combination with an autopilot transfer device, an authority limiter comprising:
 a. an input shaft which is normally free to rotate in either direction;
 b. a motor gear output shaft;
 c. an electromagnetic clutch used to couple the input shaft to said motor gear output shaft;
 d. a torque motor geared to said output shaft;
 e. a positioning potentiometer coupled to said output shaft, said positioning potentiometer generating a positioning signal representing the torque differential of the input shaft with respect to the output shaft;
 f. at least a pair of op amps for each angle mode control defining a predetermined degree of permissible angular deviation from a null position by said output shaft, said pair of op amps electrically receiving said positioning signal, and said or amps generating control signals when said output shaft is offset from said null position and when said output shaft exceeds said predetermined degree of angular deviation on either side of said null position; and
 g. means for supplying scheduled current and activating a motor bridge coupled to said torque motor such that an opposing scheduled torque is applied to said output shaft dependent upon said control signals and upon said angle mode control when said output shaft exceeds said predetermined degree of angular deviation.

* * * * *